Figure 1:
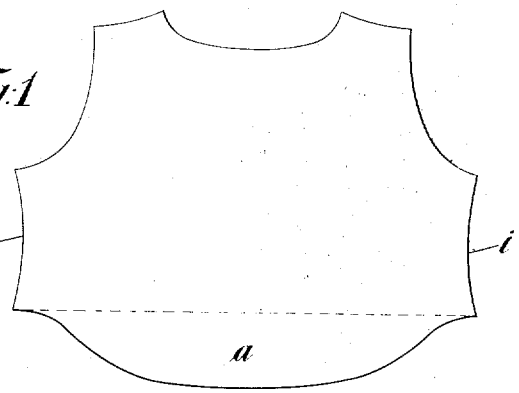

M. M. HENDERSON.

UNION SUIT.

APPLICATION FILED JULY 28, 1915.

Reissued Nov. 23, 1915.

14,019.

2 SHEETS—SHEET 1.

Mark M. Henderson, INVENTOR

BY Thos. A. Hill.

ATTORNEY

M. M. HENDERSON.

UNION SUIT.

APPLICATION FILED JULY 28, 1915.

Reissued Nov. 23, 1915.

14,019.

2 SHEETS—SHEET 2.

Mark M. Henderson, INVENTOR

BY Thos. Jas. Stiel.

ATTORNEY

UNITED STATES PATENT OFFICE.

MARK M. HENDERSON, OF NORWALK, CONNECTICUT, ASSIGNOR TO HENDERSON & ERVIN, OF NEW YORK, N. Y., A CORPORATION OF NEW YORK.

UNION SUIT.

14,019. Specification of Reissued Letters Patent. Reissued Nov. 23, 1915.

Original No. 1,070,340, dated August 12, 1913, Serial No. 760,577. Application for reissue filed July 28, 1915. Serial No. 42,445.

*To all whom it may concern:*

Be it known that I, MARK M. HENDERSON, a citizen of the United States, and resident of Norwalk, in the county of Fairfield and State of Connecticut, have invented certain new and useful Improvements in Union Suits, of which the following is a specification.

This invention relates to union suits of non-elastic material and my improvements provide means whereby free body movement of the wearer is allowed without applying tension to the material of the garment.

A further feature of my invention comprises the provision of a sanitary flap opening which fastens up at the side of the leg, and which, when closed forms a single, continuous complete covering for the rear parts.

Figure 2:
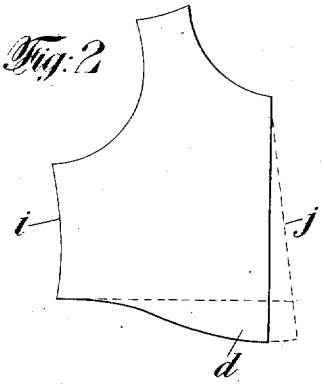
Figure 3:
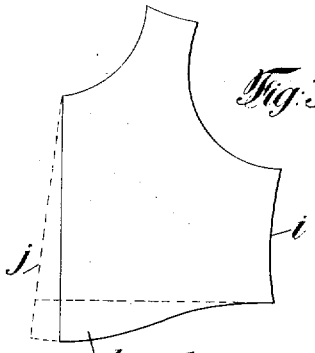
Figure 4:
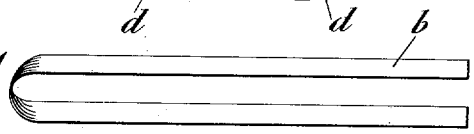
Figure 5:
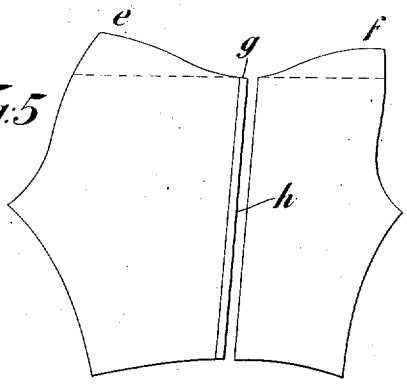
Figure 7:
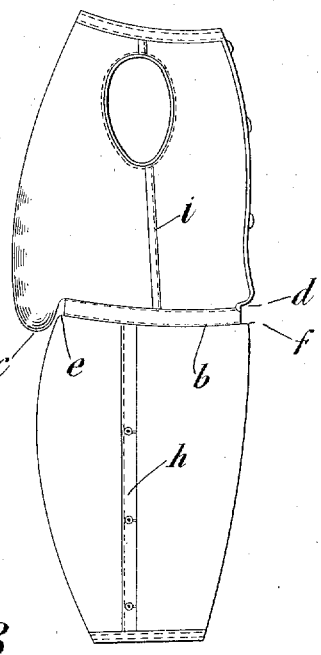
Figure 8:
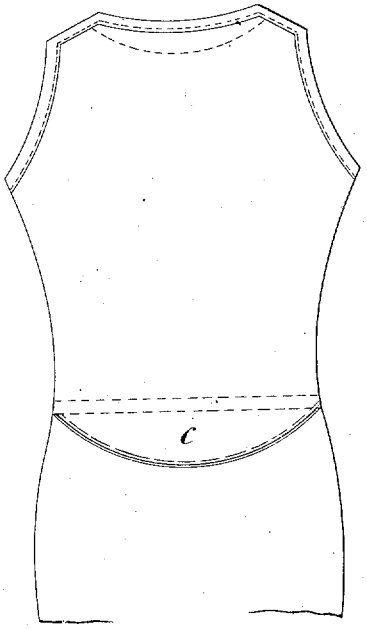
Figure 9:
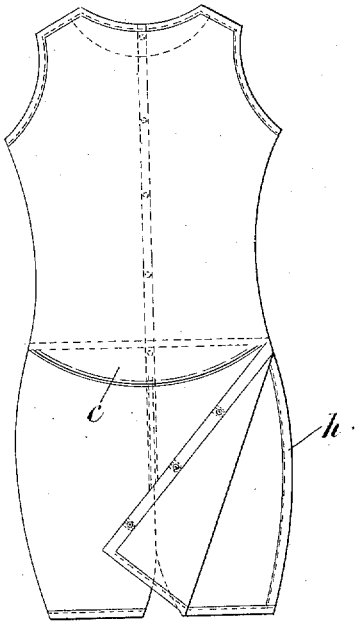

In order that my invention may be clearly comprehended and explained in detail I have included in the drawings diagrams of the several patterns or portions used in constructing the garment, as well as views of the completed union suit. Thus:

Figure 1 shows the upper back portion; Fig. 2 the right front; Fig. 3 the left front; Fig. 4 the waist band; Fig. 5 the right leg, and Fig. 6 the left leg. Fig. 7 is a side elevation of a completed garment. Fig. 8 is an enlarged, detail rear view, and Fig. 9 a complete rear view.

It being the purpose of my invention to afford full freedom of body motion without straining any portion of a union garment of non-elastic material I have resorted to a certain construction of the garment portions, both above and below the waist band, whereby, without the exercise of tension upon the band or other portions of the garment, a fullness of material is provided which accommodates itself to all such movements, allowing perfect comfort to the wearer at all times.

In Fig. 1 will be seen the fullness *a*, which, as gathered in and sewed to the waist band *b* provides the fullness *c* at the back of the garment, above the waist band which allows the wearer to stoop or bend forwardly with all freedom, without putting strain upon any part of the garment.

The front portions, as in Figs. 2 and 3, are correspondingly cut as at *d d*, allowing a fullness in front which can be increased or diminished according to whether the model is for persons of greater or less corpulency.

It will be noted that while extra material is allowed back and front in the upper garment portion, to provide the fullness referred to, the material at the opposite sides extends down to the waist band without surplus.

Figure 6:
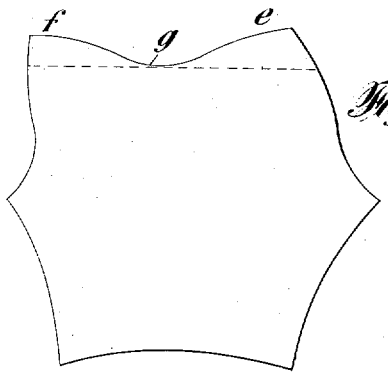

The drawers portions, as shown in Figs. 5 and 6 have each the upper fullness of material as at *e f*, which as sewed to the waist band, coincides with the fullness *c* and *d* over the intervening waist band, said drawers portions having no surplus material at their sides where they aline with the sides of the upper garment portion, which also have no surplus material. Thus, at these side portions, which may be designated by the letter *g*, the waist band forms a connector between upper and lower parts of the garment which are without fullness at these designated points. At these parts *g* the garment may be said to pivot or hinge in the various flexings of the body, while the waist band maintains its true circular position about the wearer's waist, because no strain can come upon its several parts in such movements.

The side of one drawers leg is separated in a vertical line from the lower end of the trunk to the waist band, as at *h*, and is provided with buttons and button holes (or other connecting means) whereby the separated portions may be fastened or unfastened at will. When unfastened, the rear portion of that drawers leg may be turned back as a flap, for sanitary purposes. At this time, during the bending of the wearer's body, the fullness *e f* below the waist band, coöperates with the fullness *c* above the waist band, balancing the garment and permitting perfect freedom of body movement without the application of tension upon any part of the garment.

Owing to the construction indicated the waist band is not influenced or shifted in any part thereof from its central position through the body movements because the fullness of material above and below said band and confined thereby compensate for such movements, as is obvious. It will be noted that the retention lines or seams, as *i* of the upper garment portion are shorter than either back or front portions, and have their junction with the drawers portions, over the waist band, at the points *g*; or where no fullness of material exists either above or below the waist band, and that by this means the waist band of the garment may be loose about the body, without tendency to sag.

Particular attention is directed to the location of the drawers side opening *h*, which is in a vertical line a short distance back from a vertical line in the true center of the outer side of the drawers leg, where it comes under the sphere of influence of the fullness of material provided, whereby no strain is imposed upon the fastenings of said side opening when the wearer is bending or sitting.

As shown in the patterns of Figs. 2 and 3 the front portions of the garment can be extended in the manner indicated by dotted lines *j*, to increase the girth of the garment for corpulent wearers, this extension of material coöperating with the upper and lower fullnesses of material previously referred to.

On account of the loose fit of the union suit about the wearer, the fullnesses provided, and the general construction thereof, perfect freedom of movement is allowed therein, and, because of the facility with which the garment may be shifted about the body, the sanitary flap is most readily thrown back and the entire rear parts conveniently exposed, all without the application of tension to any part of the garment.

I claim:

1. A union suit of non-elastic material consisting of a body and drawers portions connected together by a waistband, said body and drawers portions respectively having only front and back fullnesses of material at a point immediately above and below the waistband, said suit having a central front opening with fastening means and a separate and independent opening with fastening means extending from the bottom of one drawers leg, at its outer side, upwardly to the waistband, forming a rear or seat flap.

2. A union suit of non-elastic material consisting of a body and drawers portions connected together by a waistband, said body and drawers portions respectively having only front and back fullness of material at a point immediately above and below the waistband and confined thereby, and said suit having a front opening with fastening means.

3. A union suit garment consisting of non-elastic material and comprising a body portion, a drawers portion, and a waist-band connecting said portions, the body portion being provided with a fullness in the back immediately above the waistband and confined by said waistband and the side seams of the garment.

Signed at New York, in the county of New York, and State of New York, this 29th day of June, 1915.

MARK M. HENDERSON.

Witnesses:

LOUISE ENDERLE,
THOMAS A. HILL.